US009286532B2

United States Patent
Kang et al.

(10) Patent No.: US 9,286,532 B2
(45) Date of Patent: Mar. 15, 2016

(54) IMAGE PROCESSING APPARATUS AND CONTROL METHOD THEREOF

(71) Applicant: SAMSUNG ELECTRONICS CO., LTD., Suwon-si (KR)

(72) Inventors: Ji-hong Kang, Seoul (KR); Ji-hyo Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 58 days.

(21) Appl. No.: 14/326,846

(22) Filed: Jul. 9, 2014

(65) Prior Publication Data

US 2015/0092982 A1 Apr. 2, 2015

(30) Foreign Application Priority Data

Sep. 30, 2013 (KR) .................. 10-2013-0116326

(51) Int. Cl.
*G06K 9/32* (2006.01)
*G06T 7/00* (2006.01)
*G06K 9/46* (2006.01)

(52) U.S. Cl.
CPC ............ *G06K 9/3241* (2013.01); *G06K 9/4642* (2013.01); *G06T 7/0081* (2013.01); *G06K 2209/21* (2013.01); *G06T 2207/10016* (2013.01); *G06T 2207/20144* (2013.01); *G06T 2207/30196* (2013.01)

(58) Field of Classification Search
CPC .................. G06T 2207/10016; G06T 7/2033; G06T 7/20; G06K 9/3241; G06K 9/00771; G06K 9/00785; H04N 5/144
See application file for complete search history.

(56) References Cited

U.S. PATENT DOCUMENTS

2007/0237387 A1 10/2007 Avidan et al.
2011/0279685 A1* 11/2011 Alahi ................. G06K 9/00624
382/173

OTHER PUBLICATIONS

Dalal, et al.; "Histograms of Oriented Gradients for Human Detection", International Conference on Computer Vision & Pattern Recognition, Jun. 2005, pp. 1-8.

* cited by examiner

*Primary Examiner* — Duy M Dang
(74) *Attorney, Agent, or Firm* — Sughrue Mion, PLLC

(57) ABSTRACT

An image processing apparatus is provided. The apparatus includes: a processor configured to process an image according to a preset process in response to receiving the image; and a controller configured to control the processor in order to detect a figure of a human within a video frame based on a feature vector data value according to histograms of oriented gradients (HOG) algorithm of the video frame of the image input to the processor, wherein the controller divides the video frame into a foreground corresponding to a region which includes a moving object and a background corresponding to a region which excludes the foreground, removes the background, converts a target region having a preset area including at least a part of the foreground without the background into a binary image, and derives the feature vector data value from the binary image using a lookup table.

20 Claims, 8 Drawing Sheets

FIG. 6

| SERIAL NUMBER | P1 | P2 | P3 | P4 | P5 | P6 | P7 | P8 | L(x) | L(y) | L(Θ) | SECTION INDEX |
|---|---|---|---|---|---|---|---|---|---|---|---|---|
| 0 | 0 | 0 | 0 | 0 | 0 | 0 | 0 | 0 | 0 | 0 | 0 | 1 |
| 1 | 0 | 0 | 0 | 0 | 0 | 0 | 0 | 1 | 1 | 1 | 45 | 2 |
| 2 | 0 | 0 | 0 | 0 | 0 | 0 | 1 | 0 | 0 | 2 | 89.99971352 | 3 |
| 3 | 0 | 0 | 0 | 0 | 0 | 0 | 1 | 1 | 1 | 3 | 71.56505118 | 3 |
| 4 | 0 | 0 | 0 | 0 | 0 | 1 | 0 | 0 | -1 | 1 | -45 | 0 |
| 5 | 0 | 0 | 0 | 0 | 0 | 1 | 0 | 1 | 0 | 2 | 89.99971352 | 3 |
| 6 | 0 | 0 | 0 | 0 | 0 | 1 | 1 | 0 | -1 | 3 | -71.56505118 | 0 |
| 7 | 0 | 0 | 0 | 0 | 0 | 1 | 1 | 1 | 0 | 4 | 89.99985676 | 3 |
| 8 | 0 | 0 | 0 | 0 | 1 | 0 | 0 | 0 | 2 | 0 | 0 | 1 |
| 9 | 0 | 0 | 0 | 0 | 1 | 0 | 0 | 1 | 3 | 1 | 18.43494882 | 2 |
| 10 | 0 | 0 | 0 | 0 | 1 | 0 | 1 | 0 | 2 | 2 | 45 | 2 |
| 11 | 0 | 0 | 0 | 0 | 1 | 0 | 1 | 1 | 3 | 3 | 45 | 2 |
| 12 | 0 | 0 | 0 | 0 | 1 | 1 | 0 | 0 | 1 | 1 | 45 | 2 |
| 13 | 0 | 0 | 0 | 0 | 1 | 1 | 0 | 1 | 2 | 2 | 45 | 2 |
| 14 | 0 | 0 | 0 | 0 | 1 | 1 | 1 | 0 | 1 | 3 | 71.56505118 | 3 |
| 15 | 0 | 0 | 0 | 0 | 1 | 1 | 1 | 1 | 2 | 4 | 63.43494882 | 3 |
| 16 | 0 | 0 | 0 | 1 | 0 | 0 | 0 | 0 | -2 | 0 | 0 | 1 |
| 17 | 0 | 0 | 0 | 1 | 0 | 0 | 0 | 1 | -1 | 1 | -45 | 0 |
| ⋮ | ⋮ | ⋮ | ⋮ | ⋮ | ⋮ | ⋮ | ⋮ | ⋮ | ⋮ | ⋮ | ⋮ | ⋮ |
| ⋮ | ⋮ | ⋮ | ⋮ | ⋮ | ⋮ | ⋮ | ⋮ | ⋮ | ⋮ | ⋮ | ⋮ | ⋮ |
| ⋮ | ⋮ | ⋮ | ⋮ | ⋮ | ⋮ | ⋮ | ⋮ | ⋮ | ⋮ | ⋮ | ⋮ | ⋮ |
| 254 | 1 | 1 | 1 | 1 | 1 | 1 | 1 | 0 | -1 | -1 | 45 | 2 |
| 255 | 1 | 1 | 1 | 1 | 1 | 1 | 1 | 1 | 0 | 0 | 0 | 1 |

IMAGE PROCESSING APPARATUS AND CONTROL METHOD THEREOF

CROSS-REFERENCE TO RELATED APPLICATION

This application claims priority from Korean Patent Application No. 10-2013-0116326, filed on Sep. 30, 2013 in the Korean Intellectual Property Office, the disclosure of which is incorporated herein by reference, in its entirety.

BACKGROUND

1. Technical Field

Apparatuses and methods consistent with the exemplary embodiments relate to an image processing apparatus which processes video data to be displayed as an image and a control method thereof. More particularly, the exemplary embodiments relate to an image processing apparatus which can specify a figure of a human from among many objects within an image photographed by a camera, and a control method thereof.

2. Description of the Related Art

An image processing apparatus processes a video signal/video data received from an exterior, through various imaging processes. The image processing apparatus displays the processed video signal as an image on its own display panel, or outputs the processed video signal to a separate display apparatus so that the processed video signal can be displayed as an image on the display apparatus having a panel. That is, the image processing apparatus may include a panel capable of displaying an image or do not include the panel as long as it can process the video signal. An example of the former case is a television (TV). Further, an example of the latter case is a set-top box.

With development of technology, various functions of the image processing apparatus has continuously been added and extended. For example, the image processing apparatus may detect whether a human is present in front thereof through the use of a camera, and performs a preset function of the image processing apparatus in accordance with whether or not a human is detected. While detecting the human, the image processing apparatus detects and specifies a user, i.e., a shape of a human, from among many objects within each video frame of an image photographed by the camera, and determines how the specified shape of a human is varied within each video frame.

A method of detecting a shape of a human within the video frame may employ various algorithms. For example, the detection method may employ a classifier of a linear support vector machine (SVM). The classifier receives histograms of oriented gradients (HOG) data calculated based on a HOG algorithm with regard to each video frame, and detects the shape of a human based on the HOG data of each video frame.

SUMMARY

Aspects of the exemplary embodiments provide a image processing apparatus including: a processor configured to process an image according to a preset process in response to receiving the image; and a controller configured to control the processor to detect a figure of a human within a video frame based on a feature vector data value according to histograms of oriented gradients (HOG) algorithm of the video frame of the image input to the processor, wherein the controller is configured to divide the video frame into a foreground which corresponds to a region including a moving object and a background which corresponds to a region excluding the foreground, removes the background, converts a target region having a preset area including at least a part of the foreground without the background into a binary image, and derives the feature vector data value from the converted target region of the binary image.

The controller may divide the binary image into a plurality of regions, may derive feature vector data according to the divisional regions based on a lookup table previous stored according to binary value distributions of respective pixel positions of the binary image, and may derive the feature vector data value of the binary image by combining the feature vector data according to the respective divided regions.

The controller may convert the target region into the binary image by assigning '1' to pixels of a region related to the foreground and assigning '0' to pixels of a region unrelated to the foreground within the target region.

The controller may adjust the binary image to have a preset resolution, and may derive the feature vector data value from the binary image having the adjusted resolution.

The controller may determine whether noise is present in the binary data having the adjusted resolution and may selectively perform noise filtering in accordance with the results of the determination.

The controller may set up the target region to include only an upper region of the foreground, in which an upper body of a human is expected to be positioned, within the foreground excluding the background.

The controller may calculate a rotated angle of the foreground based on a depth value designated to each pixel of the image in response to the image input to the processor being a three-dimensional (3D) image, and may adjust the foreground to face frontward in a space by applying a minus value of the calculated rotated angle to the foreground.

The image processing apparatus may further include a camera which generates the image by photographing external environments of the image processing apparatus and transmits the generated image to the processor.

A method of controlling an image processing apparatus, includes: receiving an image; and detecting a figure of a human within a video frame based on a feature vector data value according to histograms of oriented gradients (HOG) algorithm of the video frame of the image, the detecting the figure of a human within the video frame, including: dividing the video frame into a foreground which corresponds to a region including a moving object and a background which corresponds to a region excluding the foreground, and removing the background; and converting a target region having a preset area including at least a part of the foreground without the background into a binary image; and deriving the feature vector data value from the binary image.

The deriving the feature vector data value from the binary image may include: dividing the binary image into a plurality of regions; deriving feature vector data according to the divisional regions based on a lookup table previously stored according to binary value distributions of respective pixel positions of the binary image; and deriving the feature vector data value of the binary image by combining the feature vector data according to the respective divisional regions.

The converting the target region into the binary image may include: assigning '1' to pixels of a region related to the foreground and assigning '0' to pixels of a region unrelated to the foreground within the target region.

The converting the target region into the binary image may include: adjusting the binary image to a preset resolution.

The converting the target region into the binary image may include: determining whether noise is present in the binary data having the adjusted resolution and selectively performing noise filtering in accordance with the results of the determination.

The converting the target region into the binary image may include: setting up the target region to only include an upper region of the foreground, in which an upper body of a human is expected to be positioned, within the foreground excluding the background.

The converting the target region into the binary image may include: calculating a rotated angle of the foreground based on a depth value designated to each pixel of the image in response to the image input to the processor being a three-dimensional (3D) image; and adjusting the foreground to face frontward in a space by applying a minus value of the calculated rotated angle to the foreground.

An aspect of an exemplary embodiment may provide an image processing apparatus including: a processor configured to process an image; and a controller configured to control the processor to detect a figure of a human within a video frame based on a feature vector data value according to histograms of oriented gradients (HOG) algorithm of the video frame, wherein the controller is configured to divide the video frame into a foreground corresponding to a region which comprises a moving object and a background corresponding to a region which excludes the foreground, to remove the background, to convert a target region having a preset area comprising at least a part of the foreground without the background into a binary image, and to derive the feature vector data value from the binary image using a lookup table.

The controller may be configured to convert the target region into the binary image by assigning '1' to pixels of a region related to the foreground and assigning '0' to pixels of a region unrelated to the foreground within the target region.

The controller may be configured to adjust the binary image to have a preset resolution, and to derive the feature vector data value from the binary image having the preset adjusted resolution.

The controller may be further configured to determine whether noise is present in the binary data having the adjusted preset resolution and selectively performs noise filtering in accordance with the results of the determination.

The image processing apparatus may further include a camera configured to generate the image by photographing the external environment of the image processing apparatus and to transmit the generated image to the processor.

BRIEF DESCRIPTION OF THE DRAWINGS

The above and/or other aspects will become apparent and more readily appreciated from the following description of exemplary embodiments, taken in conjunction with the accompanying drawings, in which:

FIG. 6 shows an example of a partial lookup table for deriving histogram data per pixel in the divisional region of the binary image;

DETAILED DESCRIPTION OF EXEMPLARY EMBODIMENTS

Figure 1:
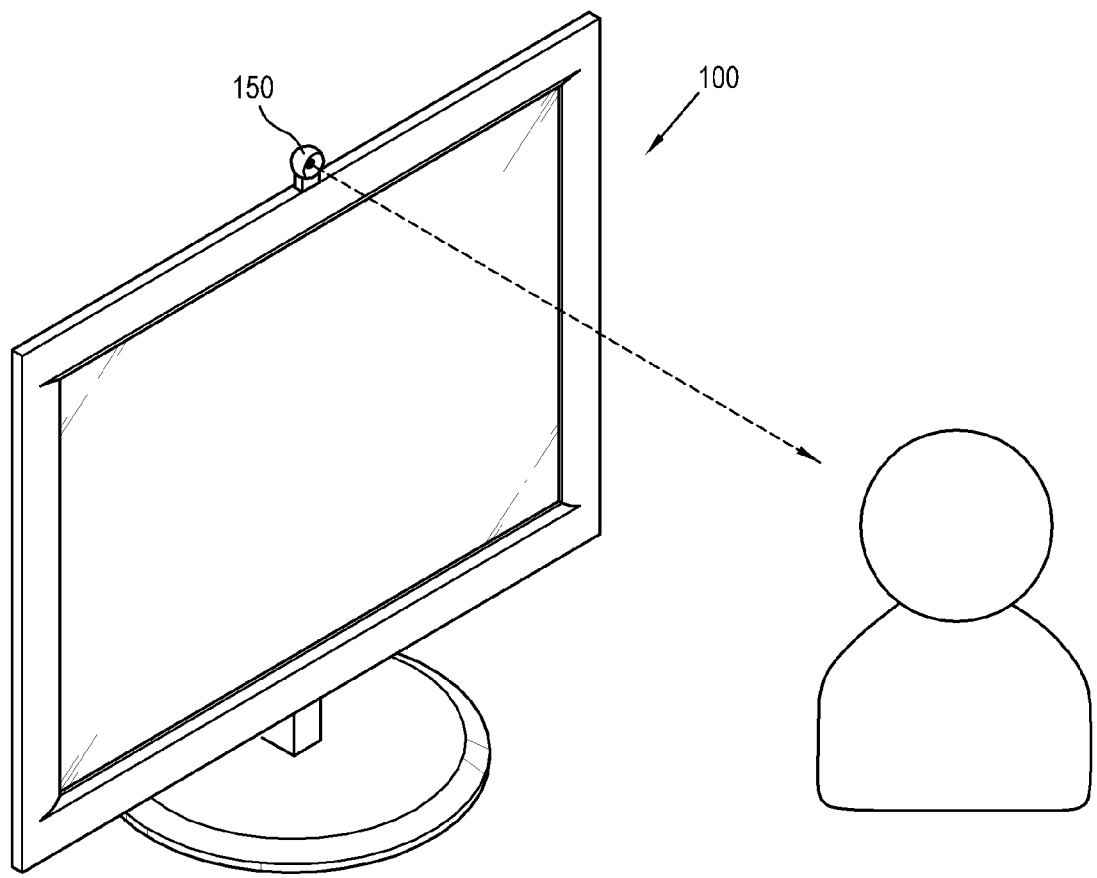
FIG. 1 shows an example of an image processing apparatus, according to an exemplary embodiment.

Below, exemplary embodiments will be described in detail with reference to accompanying drawings so as to be easily understood by a person having ordinary knowledge in the art. The exemplary embodiments may be embodied in various forms without being limited to the exemplary embodiments set forth herein. Descriptions of well-known parts are omitted for clarity, but this does not mean that the omitted parts are unnecessary for an understanding of apparatuses or systems to which the exemplary embodiments are applied. Like reference numerals refer to like elements throughout.

FIG. 1 shows an example of an image processing apparatus according to an exemplary embodiment. In this exemplary embodiment, the image processing apparatus 100 is achieved by a display apparatus having a structure capable of displaying an image by itself. However, an exemplary embodiment may be applied to even an apparatus that cannot display an image by itself, like a set-top box, and in this case the image processing apparatus 100 is locally connected to a separate external display apparatus so that the image can be displayed on the external display apparatus.

As shown in FIG. 1, the display apparatus 100 according to this exemplary embodiment processes video data and displays an image based on the video data, thereby offering the image to a user facing the display apparatus. As a general example of the display apparatus 100, there is a television (TV). In this exemplary embodiment, the TV will be described as an example of the display apparatus 100.

In accordance with various events generated by a user, the display apparatus 100 carries out a preset operation or function which corresponds to an event. As one of the events, a sensing function and an analysis are performed to determine whether a user is present in front of the display apparatus 100, whether a user makes a specific motion, etc. To this end, the display apparatus 100 include a camera 150 for photographing the external environment of the display apparatus. The display apparatus 100 specifies a figure of a user from an image photographed by the camera 150, and determines what motion the user makes, based on the specified figure.

Below, the configurations of the display apparatus 100 are described, as follows.

Figure 2:
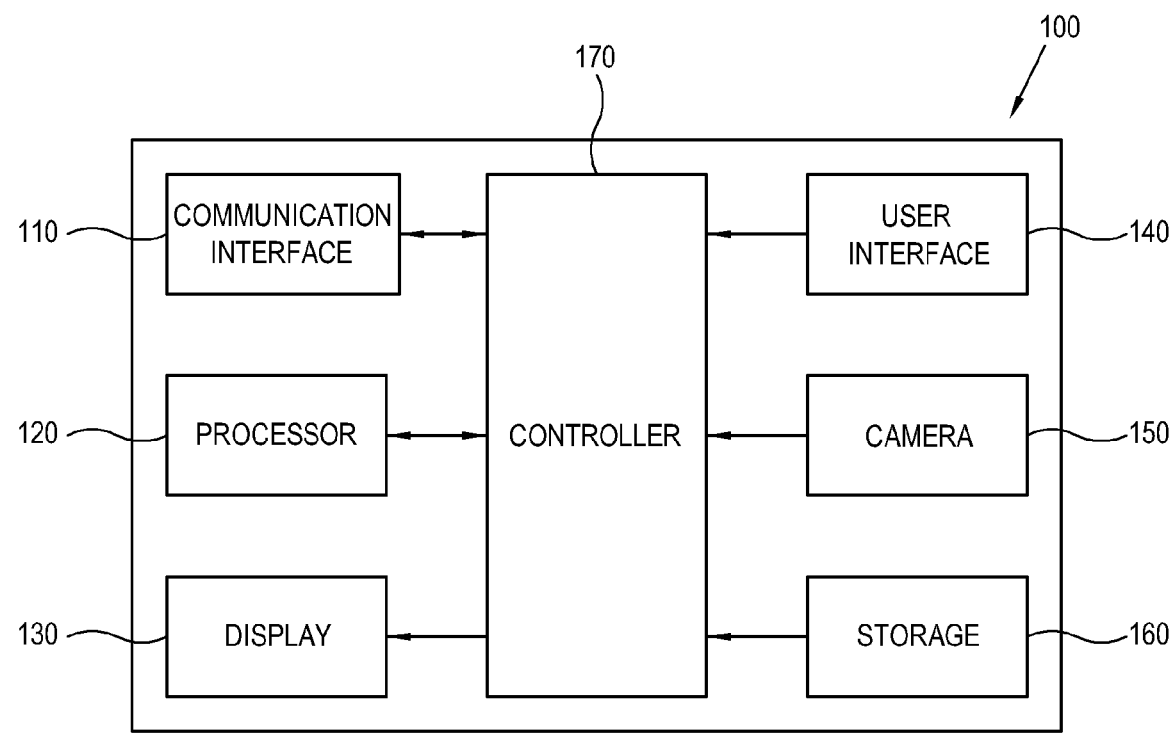
FIG. 2 is a block diagram of the image processing apparatus of FIG. 1.

FIG. 2 is a block diagram of the image processing apparatus 100.

As shown in FIG. 2, the display apparatus 100 includes a communication interface 110 which performs communication with the exterior of the display apparatus to transmit/receive data related to a signal, a processor 120 which processes data received in the communication interface 110 in accordance with a preset process, a display 130 which displays video data as an image in response to data processed in the processor 120 being the video data, a user interface 140 which obtains a user's input, a camera 150 which photographs the external environment of the display apparatus 100, a storage 160 which stores data/information, and a controller 170 which controls general operations of the display apparatus 100.

The communication interface 110 transmits/receives data so that interactive communication can be performed between the display apparatus 100 and a server or an external device (not shown). The communication interface 110 accesses the server or the external device (not shown) through wide/local area networks or locally in accordance with preset communication protocols.

The communication interface 110 may be implemented by connection ports according to devices or an assembly of connection modules, in which the protocol for connection or the external device for connection is not limited to one kind or type of device. The communication interface 110 may be a built-in device of the display apparatus 100, or the entire device or a part thereof may be added to the display apparatus 100 in the form of an add-on or dongle.

The communication interface 110 transmits/receives a signal in accordance with protocols designated according to the connected devices, in which the signals can be transmitted/received based on individual connection protocols with regard to the connected devices. In the case of video data, the communication interface 110 may transmit/receive the signal bases on various standards such as a radio frequency (RF) signal, composite/component video, super video, Syndicat des Constructeurs des Appareils Radiorécepteurs et Téléviseurs (SCART), high definition multimedia interface (HDMI), display port, unified display interface (UDI), or wireless HD, etc.

The processor 120 performs various processes with regard to data, related to a signal received in the communication interface 110. In response to the communication interface 110 receiving video data, the processor 120 applies an imaging process to the video data and the video data processed by this process is output to display 130, thereby allowing the display 130 to display an image based on the corresponding video data. In response to the signal received in the communication interface 110 being a broadcast signal, the processor 120 extracts video, audio and appended data from the broadcast signal tuned to a certain channel, and adjusts an image to have a preset resolution, so that the image can be displayed on the display 130.

There is no limit to the kind of imaging processes to be performed by the processor 120. For example, there is decoding which corresponds to an image format of the video data, de-interlacing for converting the video data from an interlace type into a progressive type, scaling for adjusting the video data to have a preset resolution, noise reduction for improving image qualities, detail enhancement, frame refresh rate conversion, etc.

The processor 120 may perform various processes in accordance with the kinds and attributes of data, and thus the process to be implemented in the processor 120 is not limited to the imaging process. Also, the data processable in the processor 120 is not limited to only that received in the communication interface 110. For example, the processor 120 processes a user's utterance through a preset voicing process in response to the user interface 140 receiving the corresponding utterance.

The processor 120 may be achieved by an image processing board (not shown) with a system-on-chip where various functions are integrated or an individual chip-set capable of independently performing each process is mounted on a printed circuit board. The processor 120 may be built-in the display apparatus 100, but is not limited thereto.

The display 130 displays the video signal/the video data which is processed by the processor 120 as an image. The display 130 may be achieved by various display types of devices such as liquid crystal, plasma, a light-emitting diode, an organic light-diode, a surface-conduction electron-emitter, a carbon nano-tube and a nano-crystal, but is not limited thereto.

The display 130 may additionally include an appended element in accordance with its types. For example, in the case of the liquid crystal type of display, the display 130 may include a liquid crystal display (LCD) panel (not shown), a backlight (not shown) which emits light to the LCD panel, a panel driving substrate (not shown) which drives the panel (not shown), etc.

The user interface 140 transmits various preset control commands or information to the controller 170 in accordance with a user's control or input. The user interface 140 provides information regarding various events that occur in accordance with a user's intentions and transmits the information to controller 170. The events that are performed by a user may have various forms, and may for example include a user's control of a remote controller, utterance, etc.

The camera 150 photographs external environments of the display apparatus 100; in particular, a user's figure, and transmits a photographed result to the processor 120 or the controller 170. The camera 150 offers the photographed image of photographing a user's figure by a two-dimensional (2D) or three-dimensional (3D) photographing method to the processor 120 or the controller 170, so that the controller 170 can specify a user's shape or figure within a video frame of the photographed image.

The storage 160 stores various data under control of the controller 170. The storage 160 is implemented as a nonvolatile memory such as a flash memory, a hard disk drive, etc., so as to retain data regardless of power on/off of the system. The storage 150 is accessed by the controller 170 so that previously stored data can be read, recorded, modified, deleted, updated, and so on.

The controller 170 is implemented as a central processing unit (CPU), and controls operations of general elements of the display apparatus 100, such as the processor 120, in response to occurrence of a predetermined event. In this exemplary embodiment, the controller 170 receives a photographed image from the camera 150 and determines whether a user is present in front of the camera, by analyzing a video frame of the photographed image. The controller 170 controls a preset operation to be performed in accordance with the motion of a user or the presence of a user, based on the results of the determination.

To determine the presence of a user, the controller 170 has to first specify a figure of a human from among many objects within a video frame of a photographed image. In accordance with installation environments of the display apparatus 100, various objects may be involved within the video frame of the image photographed by the camera 150. Among these objects, a moving object is not always a human. Therefore, for the foregoing operations of the display apparatus 100, there exists a need for a method or algorithm for specifying a shape of an object within the video frame and determining the specified object as a human.

Below, a structure for detecting a figure of a human within the video frame of the photographed image will be described according to an exemplary embodiment.

Figure 3:
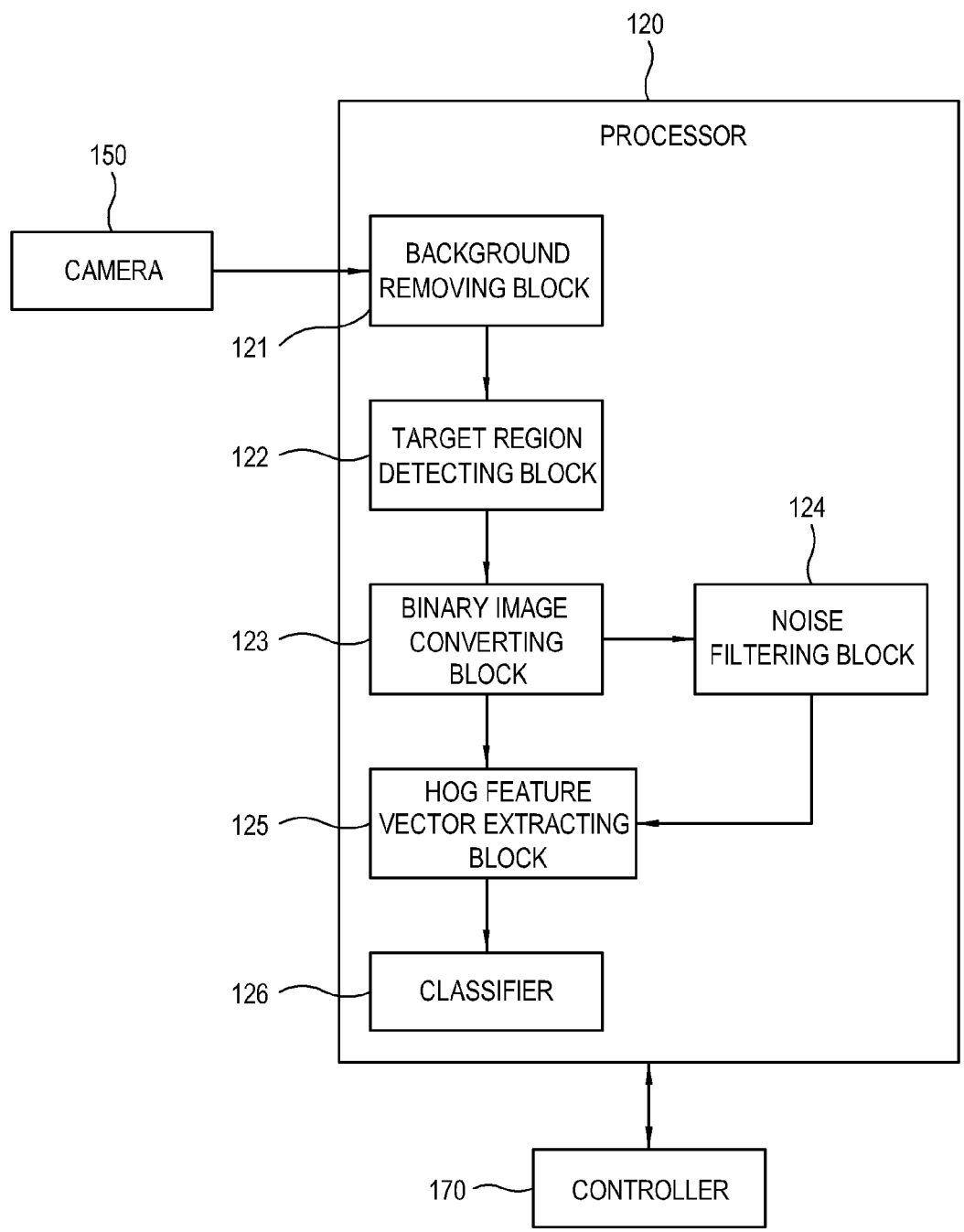
FIG. 3 is a block diagram of a processor in the image processing apparatus of FIG. 1.

FIG. 3 is a block diagram of the processor 120.

As shown in FIG. 3, the processor 120 according to this exemplary embodiment include a plurality of modules or blocks 121, 122, 123, 124, 125 and 126 for processing the photographed image received from the camera 150.

These blocks 121, 122, 123, 124, 125 and 126 are sorted with respect to functions for convenience, and do not limit the implementation of the processor 120. These blocks 121, 122, 123, 124, 125 and 126 may be achieved by hardware or software or by a combination of both. The respective blocks 121, 122, 123, 124, 125 and 126 that constitute the processor 120 may independently perform their operations. Alternatively, the processor 120 may be not divided into individual blocks 121, 122, 123, 124, 125 and 126 and may perform the whole of the operations in sequence. Also, the operations of the processor 120 are performed under control of the controller 170.

The processor 120 may include a background removing block 121, a target region detecting block 122, a binary image converting block 123, a noise filtering block 124, a HOG feature vector extracting block 125 and a classifier 126.

Below, the operations of the respective blocks will be described with respect to a video frame of a photographed image transmitted from the camera 150.

The background removing block 121 divides the video frame transmitted from the camera 150 into a foreground and a background, and removes the background from the video frame. While distinguishing between the foreground and the background, the background removing block 121 determines a region which includes a moving object as the foreground, and determines a region which includes a stationary object as the background.

There may be various methods for distinguishing the foreground and the background. For example, among many video frames, a video frame where all objects are stationary is selected as a reference video frame, and an interesting video frame is compared with the selected reference video frame so that the determination can be achieved based on this difference. Alternatively, an average value and a distribution value are respectively calculated from a history of pixel values of the video frame, and a plurality of Gaussian distributions are continuously updated, thereby determining the pixel values deviating from the corresponding Gaussian distribution as the foreground. However, the method of distinguishing between the foreground and the background is not limited to the foregoing examples, but may be varied depending on the design.

The target region detecting block 122 sets up an interesting or target region which corresponds to a rectangular region in which the foreground remains after the background removing block 121 removes the background. The target region detecting block 122 may set up a target region to include the entire foreground. Alternatively, the target region detecting block 122 may set up a target region to include only an upper region of the foreground, in which a head and a shoulder of a human are expected to be positioned, in response to the target region detecting block 122 being set up to detect the region which corresponds to not the whole figure of a human but only the head and the shoulder of the human.

In general, while a human moves, the largest variation occurs in the human's arms. As compared with the variation in the arms, variation in a head or shoulder of a human is relatively small. Therefore, in response to a determination as to whether or not the foreground is a human with respect to his/her head and shoulder, the determination has higher accuracy than that using the whole figure of the human. Also, in response to the target region being set up to only include the upper region of the foreground, the amount of operations for this target region is effectively reduced as compared with that operation including the whole foreground. According to an exemplary embodiment, the target region is set up to include the upper region of the foreground, with respect to a head and shoulder of a human.

The binary image converting block 123 converts the target region set up by the target region detecting block 122 into a binary image of the foreground and the background. For example, in a case of using a 1-bit single channel image, the binary image converting block 123 assigns '1' to pixels which correspond to the foreground and assigns '0' to pixels which correspond to the background within the target region, thereby generating the binary image.

The binary image converting block 123 adjusts the generated binary image to have a preset size, for example, a size of 24×24 pixels. To adjust the size of the binary image, various methods may be used. For example, nearest neighbor interpolation, and the like, method may be used to quickly adjust the size of the generated binary image. The nearest neighbor interpolation is a publicly known algorithm, and thus a detailed description thereof will be omitted. In addition, various methods may be used to adjust the size of the binary image.

The noise filtering block 124 filters out noise from the binary image in response to a determination that a boundary line of the foreground of the binary image generated by the binary image converting block 123 is not soft due to the noise. The noise filtering block 124 may employ a morphological operation, Gaussian smoothing and the like, filtering in order to filter out the noise.

In response to a determination that there is no need for the noise filtering with regard to the binary image, the binary image is not transmitted to the noise filtering block 124 but rather is directly transmitted to the HOG feature vector extracting block 125.

The HOG feature vector extracting block 125 applies the histograms of the oriented gradients (HOG) algorithm to the binary image, which is directly received from the binary image converting block 123 or from which noise is filtered out by the noise filtering block 124, thereby deriving a HOG feature vector data value of the corresponding binary image.

The classifier 126 may employ various detection models to determine whether the foreground within the video frame is a figure of a human, based on the HOG feature vector data value derived by the HOG feature vector extracting block 125. The detection models employed in the classifier 126 may include various machine learning algorithms such as Bayes classifier, linear support vector machine (SVM), Kernel based SVM, neural network, etc. These algorithms are publicly known, and thus detailed descriptions thereof will be omitted. For example, in response to a quick operation being required for the detection, the classifier 126 may employ the linear SVM.

Below, a method of calculating the HOG feature vector data value through the HOG algorithm with respect to the converted binary image will be described. The histograms of the oriented gradients (HOG) are publicly known, and thus fundamental descriptions thereof will be omitted.

Figure 4:
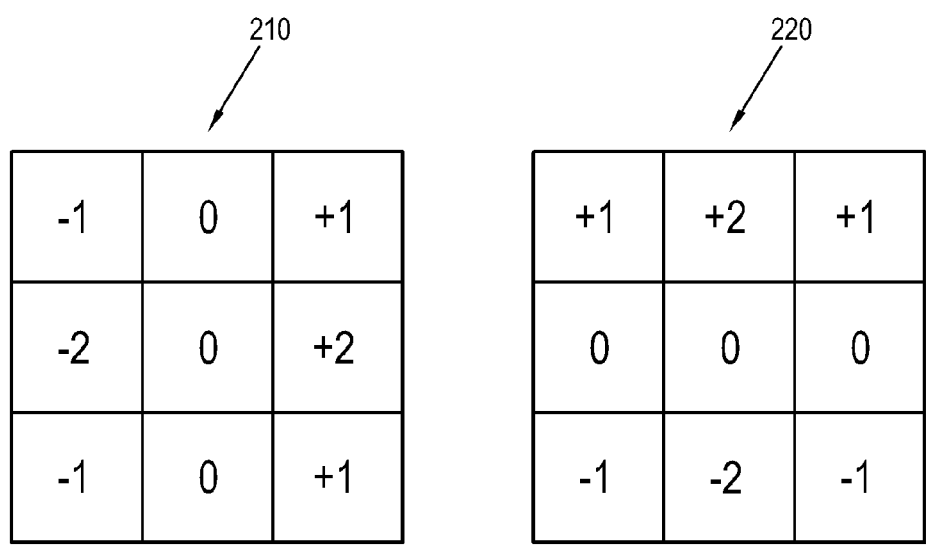
FIG. 4 shows an example of X and Y directional masks for operation with regard to a target pixel of an image in accordance with a Sobel operator method.
Figure 4:
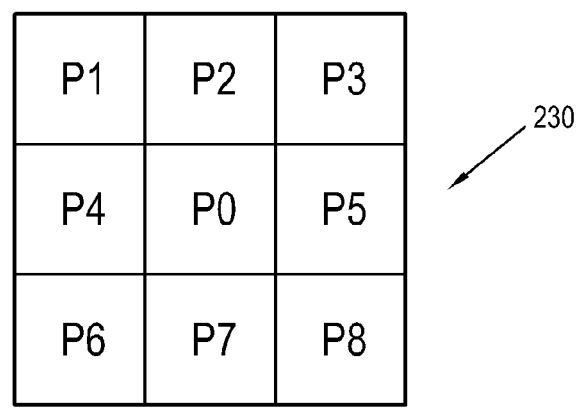

FIG. 4 shows an example of X and Y directional masks for operation with regard to a target pixel of an image, in accordance with a Sobel operator method.

In this exemplary embodiment, the Sobel operator method is described as an example of an edge extracting algorithm, but is not limited thereto. Alternatively, an available edge extracting algorithm may include Prewitt, Roberts, Compass, Laplacian, Laplacian of Gaussian, LoG, Canny, etc. Thus, there is no limit to the following exemplary embodiments.

Suppose that the binary image has 24×24 pixels. This binary image is divided into 36 regions each having a size of 4×4 pixels, and the HOG feature vector data value may be calculated with regard to every divisional region. The HOG feature vector data value has two features of a size value and a direction value. In the case of the binary image, the size value shows a remarkable difference regardless of whether it is calculated with regard to the divisional region or the video frame. Since the binary image is used in this exemplary embodiment, only the direction value of the HOG feature vector data value will be taken into account.

To obtain the oriented gradient of one pixel through the Sobel operator method at each pixel position within one divisional region, the following method is used.

As shown in FIG. 4, the Sobel operator method offers two operation masks of an X directional operator 210 and a Y directional operator 220 which each have a size of 3×3 pixels. In response to a region 230 to be calculated being set up to include 8 neighboring pixels centering around a target pixel P0 within one divisional region of the binary image, the following expressions are established among the region 230 to be calculated, the X directional operator 210 and the Y directional operator 220.

$$L(x) = -1*P1 - 2*P4 - 1*P6 + 1*P3 + 2*P5 + 1*P8$$

$$L(y) = +1*P1 + 2*P2 + 1*P3 - 1*P6 - 2*P7 + 1*P8$$

$$L(\theta) = \arctan(L(y)/L(x))$$

where, $L(x)$ indicates an X directional gradient value of the target pixel, $L(y)$ indicates a Y directional gradient value of the target pixel, and $L(\theta)$ indicates a gradient angle of the target pixel.

Further, P1, P2, P3, P4, P5, P6, P7 and P8 are binary values of respective neighboring pixels adjacent to the target pixel in 8 directions, each of which has a value of '0' or '1'.

With this method, gradient angles can be respectively calculated with regard to a total 16 pixels included in one divisional region having a size of 4×4 pixels. The gradient angles calculated according to pixels are distributed according to preset angle range sections, thereby forming a histogram.

Figure 5:
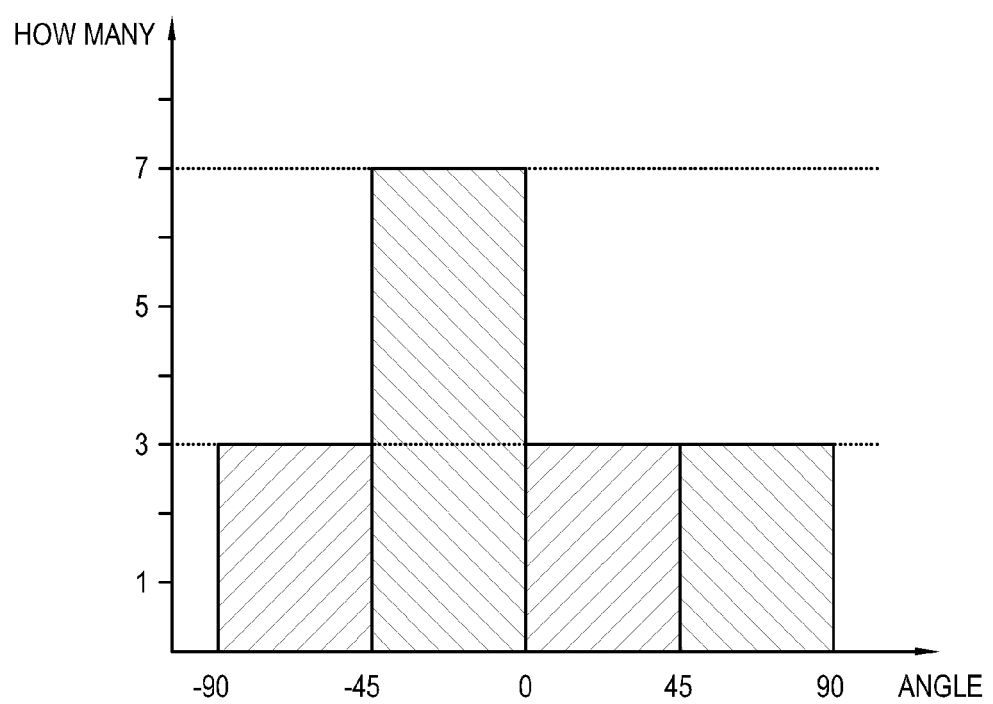
FIG. 5 shows an example of a histogram with regard to a divisional region of the binary image.

FIG. 5 shows an example of a histogram with regard to one divisional region of the binary image.

As shown in FIG. 5, in response to the angle section for the histogram being divided into four sections, the angle section for the histogram may be divided as follows: $-90 < L(\theta) \le -45$, $-45 < L(\theta) \le 0$, $0 < L(\theta) \le 45$, $45 < L(\theta) < 90$. There is no limit to such a divisional method, and the angle section may be divided into less than or larger than four sections. Here, the angle section has to range from −90 degrees to 90 degrees because an arctangent function shows a numerical value within the corresponding range. However, if the signs of the X directional operator and the Y directional operator are taken into account, this range may be extended from 0 to 360 degrees.

For example, if each of the 16 pixels of one divisional region has a value of $L(\theta)$ as follows: three at $-90 < L(\theta) \le -45$; seven at $-45 < L(\theta) \le 0$; three at $0 < L(\theta) \le 45$; and three at $45 < L(\theta) < 90$, the histograms are as shown in FIG. 5. If the counted values according to the angle ranges forming the corresponding histograms are listed, a series of histogram data [3733] is obtained. In response to the histogram data of 36 divisional regions included in the binary image having a size of 24×24 pixels is connected in a row, a series of numerical data is derived as a decimal number. The data derived as above is a HOG feature vector data value of the corresponding binary image.

The HOG feature vector data value of the corresponding binary image, calculated as above, is input to the classifier 126 (refer to FIG. 3), and therefore a figure of a human is detected through the classifier 126.

Meanwhile, the foregoing method of calculating the HOG feature vector data value, described with reference to FIGS. 4 and 5, may overload the operations in accordance with the system characteristics of the display apparatus 100. In the case where the display apparatus 100 is a general TV, the apparatus' own performance may be restricted, or multitasking, and the like, factors of deteriorating the system may be caused. In this regard, in response to the display apparatus 100 calculating the HOG feature vector data value through the above method, the calculating may cause the operations to be delayed.

According to an exemplary embodiment, the following method is proposed to reduce the amount of operations needed for calculating the HOG feature vector data value.

FIG. 6 shows an example of a partial lookup table for deriving histogram data per pixel in the divisional region of the binary image.

As shown in FIG. 6, basic conditions of the lookup table are as follows.

A serial number ranges from 0 to 255, which is a total 256 numbers. In the target region 230 (refer to FIG. 4 having a size of 3×3 pixels, each pixel has a value of '0' or '1' and thus a total number of cases where the binary values of P1 to P8 for 8 neighboring pixels are combined is 256.

P1 to P8, $L(x)$, $L(y)$ and $L(\theta)$ are the same as those described in the foregoing exemplary embodiments. However, in response to $L(x)$ being 0, it is impossible to calculate $L(\theta)$. Therefore, in response to $L(x)$ being 0, $L(x)$ can be substituted with a sufficiently small value of 0.00001, thereby calculating $L(\theta)$.

Section indexes correspond to total 4 sections of 0, 1, 2 and 3, respectively. A total number of section indexes refers to the number of angle sections set up for the histograms of FIG. 5.

That is, in response to the angle section of the histogram being set up to include total four sections of $-90 < L(\theta) \le -45$, $-45 < L(\theta) \le 0$, $0 < L(\theta) \le 45$ and $45 < L(\theta) < 90$, a section index for $-90 < L(\theta) \le -45$ is 0; a section index for $-45 < L(\theta) \le 0$ is 1; a section index for $0 < L(\theta) \le 45$ is 2; and a section index for $45 < L(\theta) < 90$ is 3.

Of course, such setting of the section index is varied depending on how angle section the histogram is divided, how the range is divided into, or what type of edge extraction algorithm is used. In this drawing, the section indexes shown in the lookup table are a result of the angle section of the histogram being divided into four sections of the foregoing range, and therefore the section indexes of the lookup table are varied in response to the division number or range for the section being varied.

Thus, the lookup table contains the values of $L(x)$, $L(y)$, $L(\theta)$ and the section indexes are previously calculated in accordance with the number of cases. The lookup table is previously stored in the storage 160 (refer to FIG. 2) and used by the processor 120 or the controller 170 in response to the HOG feature vector data value being calculated.

For example, the HOG feature vector extracting block 125 may use the present lookup table instead of the existing HOG algorithm in order to derive the HOG feature vector data value of the binary image, so that a quick operation may be obtained.

That is, the HOG feature vector extracting block 125 does not calculate $L(x)$, $L(y)$ and $L(\theta)$, and directly searches the section indexes from the lookup table in response to a binary value (refer to FIG. 4) of P1 to P8 being checked with respect to a certain pixel. Further, the HOG feature vector extracting block 125 derives the histogram data of respective divisional regions in accordance with distributions of the searched section indexes, and derives the HOG feature vector data value of the binary image from the histogram data, according to the respective divisional regions.

As above, the lookup table of which the section indexes are previously set up can be set up because an image to be operated is not a bitmap image but a binary image. The binary image has only two pixel values of '0' or '1', and thus the number of total combinations, i.e., 256 is relatively small. On the other hand, the bitmap image has 256 pixel values of 0 to 255, and thus the number of combinations is largely increased by an incomparable amount. Accordingly, such a lookup table is inadequate for the bitmap image. On the other hand, according to an exemplary embodiment, the lookup table is adequate because the binary image is used, thereby quickly performing the operations.

Camera 150 may photographs a three-dimensional (3D) image, and thus the 3D image may be input to the processor 120. In a case of detecting a human within a 3D image, the controller 170 can determine what angle a user rotates with respect to a Z axis because each pixel has a depth value. Thus, the controller 170 performs compensation by rotating a foreground of an image by a minus value of the rotated angle so that a human can face frontward. The subsequent processing methods are the same as those described with reference to FIG. 3.

Figure 7:
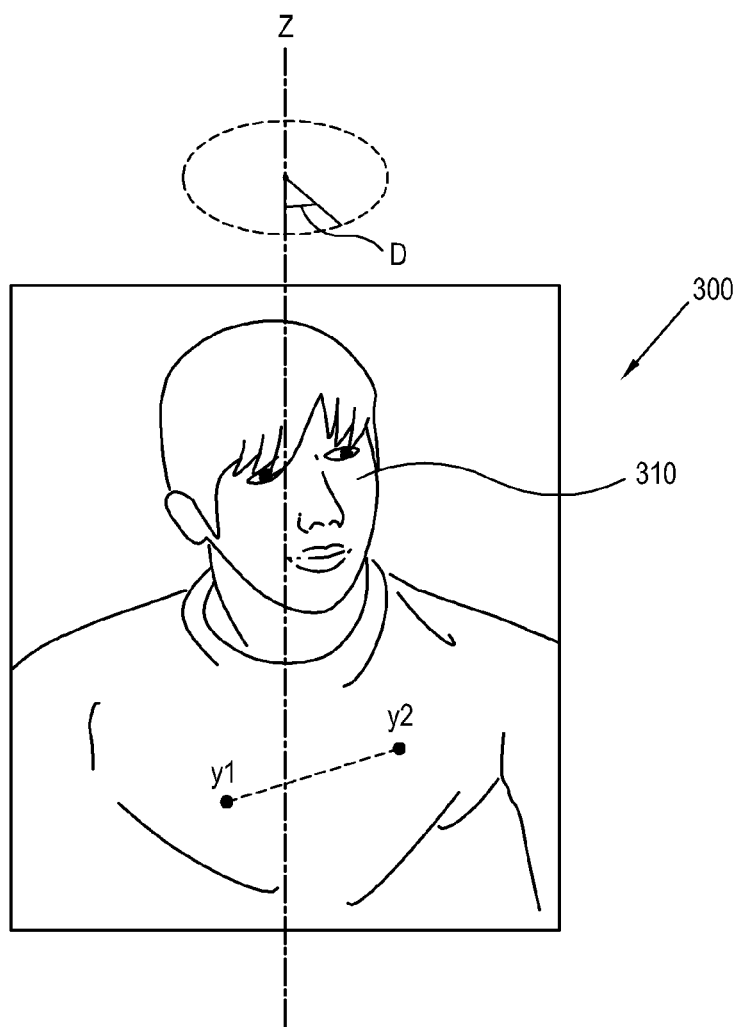
FIG. 7 shows an example of a method of obtaining a rotated angle of a foreground within a three-dimensional (3D) image.

FIG. 7 shows an example of a method of obtaining a rotated angle of a foreground 310 within a three-dimensional (3D) image 300.

As shown in FIG. 7, suppose that a foreground 310 corresponding to a figure of a human is present within the 3D image 300. The controller 170 detects a straight line y1-y2 on a horizontal axis, i.e., a Y axis perpendicular to a Z axis. The controller 170 determines how much the pixels are distant from the camera 150, based on the depth values of the respective pixels on the straight line y1-y2. Further, the controller 170 calculates a rotated direction and angle of the straight line y1-y2 with respect to the Z axis, in accordance with the results of the determination.

The controller 170 rotates the foreground 310 by an angle of −D within the image 300, thereby adjusting a position of the foreground 310.

Below, a method of controlling the image processing apparatus 100 according to an exemplary embodiment will be described.

Figure 8:
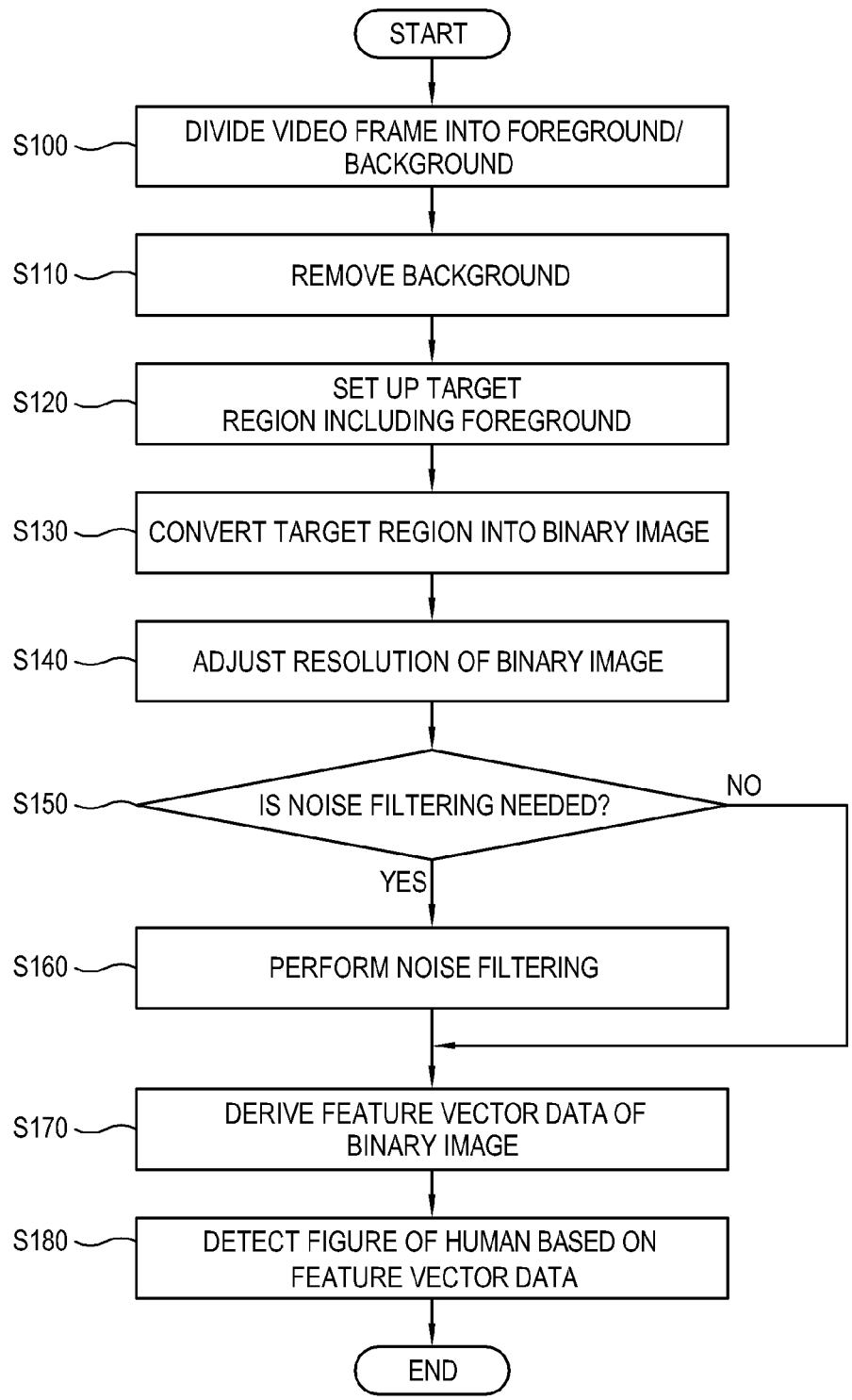
FIG. 8 is a flowchart showing a method of controlling the image processing apparatus of FIG. 1.

FIG. 8 is a flowchart showing a method of controlling the image processing apparatus 100 of FIG. 1.

As shown in FIG. 8, the image processing apparatus 100 divides the video frame into a foreground containing a moving object, and a background containing a stationary object at operation S100, and removes the background at operation S110.

At operation S120, the image processing apparatus 100 sets up the target region having a preset area to contain at least a part of the foreground without the background. The target region may include the entire foreground or a part of the foreground in accordance with the design.

At operation S130, the image processing apparatus 100 converts the target region into the binary image so that the pixel values of the region which correspond to the foreground can be distinguished from those of the other region. That is, the image processing apparatus 100 assigns '1' to the pixels of the region which corresponds to the foreground, but assigns '0' to the pixels of the other regions.

At operation S140, the image processing apparatus 100 adjusts the binary image to have a preset resolution.

At operation S150, the image processing apparatus 100 determines whether there is a need to filter out noise from the binary image. In response to a determination that noise filtering is need, at operation S160 the image processing apparatus 100 performs noise filtering for the binary image and proceeds to operation S170. On the other hand, in response to a determination that noise filtering is not needed, the image processing apparatus 100 proceeds directly to the operation S170.

At operation S170, the image processing apparatus 100 derives the feature vector data of the binary image based on the HOG feature vector data value through the HOG algorithm. The image processing apparatus 100 does not directly carry out mathematical operations, but derives a needed value by searching the previously stored lookup table.

At operation S180, the image processing apparatus 100 detects a figure of a human within the video frame, based on the HOG feature vector data value.

According to this exemplary embodiment, an image used for extracting the feature vector data is not a gray scale or colorful bitmap image but a binary image, and thus the lookup table can be used in the operations, thereby remarkably shortening the time necessary to perform the operations.

Also, instead of using the entire video frame, a foreground image derived by removing the background or a part of the foreground is set up as an interesting region in order to detect a figure of a human, thereby reducing an area of a region to be detected.

In this exemplary embodiment, a binary image is used to calculate the HOG feature vector data, and therefore there is no need of complicated operations due to the use of a conventional HOG algorithm.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. An image processing apparatus comprising:
 a processor configured to process an image according to a preset process in response to receiving the image; and
 a controller configured to control the processor to detect a figure of a human within a video frame based on a feature vector data value according to histograms of oriented gradients (HOG) algorithm of the video frame of the image input to the processor,
 wherein the controller is configured to divide the video frame into a foreground corresponding to a region which comprises a moving object and a background corresponding to a region which excludes the foreground, to remove the background, to convert a target region having a preset area comprising at least a part of the foreground without the background into a binary image, and to derive the feature vector data value from the binary image.

2. The image processing apparatus according to claim 1, wherein the controller is configured to divide the binary image into a plurality of regions, to derive feature vector data according to the divisional regions based on a lookup table previously stored according to binary value distributions of respective pixel positions of the binary image, and derives the feature vector data value of the binary image by combining the feature vector data according to the respective divisional regions.

3. The image processing apparatus according to claim 1, wherein the controller is configured to convert the target region into the binary image by assigning '1' to pixels of a region related to the foreground and assigning '0' to pixels of a region unrelated to the foreground within the target region.

4. The image processing apparatus according to claim 1, wherein the controller is configured to adjust the binary image to have a preset resolution, and to derive the feature vector data value from the binary image having the preset adjusted resolution.

5. The image processing apparatus according to claim 4, wherein the controller is configured to determine whether noise is present in the binary data having the adjusted resolution and to selectively perform noise filtering in accordance with the results of the determination.

6. The image processing apparatus according to claim 1, wherein the controller sets up the target region to comprise only an upper region of the foreground, in which an upper body of a human is expected to be positioned, within the foreground which excludes the background.

7. The image processing apparatus according to claim 1, wherein the controller is configured to calculate a rotated angle of the foreground based on a depth value designated to each pixel of the image in response to the image input to the processor being a three-dimensional (3D) image, and to adjust the foreground to face frontward in a space by applying a minus value of the calculated rotated angle to the foreground.

8. The image processing apparatus according to claim 1, further comprising a camera configured to generate the image by photographing the external environment of the image processing apparatus and to transmit the generated image to the processor.

9. A method of controlling an image processing apparatus, comprising:
   receiving an image; and
   detecting a figure of a human within a video frame based on a feature vector data value according to histograms of oriented gradients (HOG) algorithm of the video frame of the image,
   the detecting the figure of a human within the video frame, the method comprising:
   dividing the video frame into a foreground corresponding to a region which comprises a moving object and a background corresponding to a region which excludes the foreground, and removing the background; and
   converting a target region having a preset area comprising at least a part of the foreground without the background into a binary image; and
   deriving the feature vector data value from the binary image.

10. The method according to claim 9, wherein the deriving the feature vector data value from the binary image comprises:
   dividing the binary image into a plurality of regions;
   deriving feature vector data according to the divisional regions based on a lookup table previous stored according to binary value distributions of respective pixel positions of the binary image; and
   deriving the feature vector data value of the binary image by combining the feature vector data according to the respective divided regions.

11. The method according to claim 9, wherein the converting the target region into the binary image comprises: assigning '1' to pixels of a region related to the foreground and assigning '0' to pixels of a region unrelated to the foreground within the target region.

12. The method according to claim 9, wherein the converting the target region into the binary image comprises: adjusting the binary image to have a preset resolution.

13. The method according to claim 12, wherein the converting the target region into the binary image comprises: determining whether noise is present in the binary data having the adjusted resolution and selectively performing noise filtering in accordance with the results of the determination.

14. The method according to claim 9, wherein the converting the target region into the binary image comprises: setting up the target region to comprise only an upper region of the foreground, in which an upper body of a human is expected to be positioned, within the foreground which excludes the background.

15. The method according to claim 9, wherein the converting the target region into the binary image comprises:
   calculating a rotated angle of the foreground based on a depth value designated to each pixel of the image in response to the image input to the processor being a three-dimensional (3D) image; and
   adjusting the foreground to face frontward in a space by applying a minus value of the calculated rotated angle to the foreground.

16. An image processing apparatus comprising:
   a processor configured to process an image; and
   a controller configured to control the processor to detect a figure of a human within a video frame based on a feature vector data value according to histograms of oriented gradients (HOG) algorithm of the video frame,
   wherein the controller is configured to divide the video frame into a foreground corresponding to a region which comprises a moving object and a background corresponding to a region which excludes the foreground, to remove the background, to convert a target region having a preset area comprising at least a part of the foreground without the background into a binary image, and to derive the feature vector data value from the binary image using a lookup table.

17. The image processing apparatus according to claim 16, wherein the controller is configured to convert the target region into the binary image by assigning '1' to pixels of a region related to the foreground and assigning '0' to pixels of a region unrelated to the foreground within the target region.

18. The image processing apparatus according to claim 17, wherein the controller is configured to adjust the binary image to have a preset resolution, and to derive the feature vector data value from the binary image having the preset adjusted resolution.

19. The image processing apparatus according to claim 18, wherein the controller is configured to determine whether noise is present in the binary data having the adjusted preset resolution and to selectively perform noise filtering in accordance with the results of the determination.

20. The image processing apparatus according to claim 16, further comprising a camera configured to generate the image by photographing the external environment of the image processing apparatus and transmitting the generated image to the processor.

* * * * *